B. C. HOLT.
COMBINED HARVESTER AND THRESHER.
APPLICATION FILED DEC. 12, 1916.

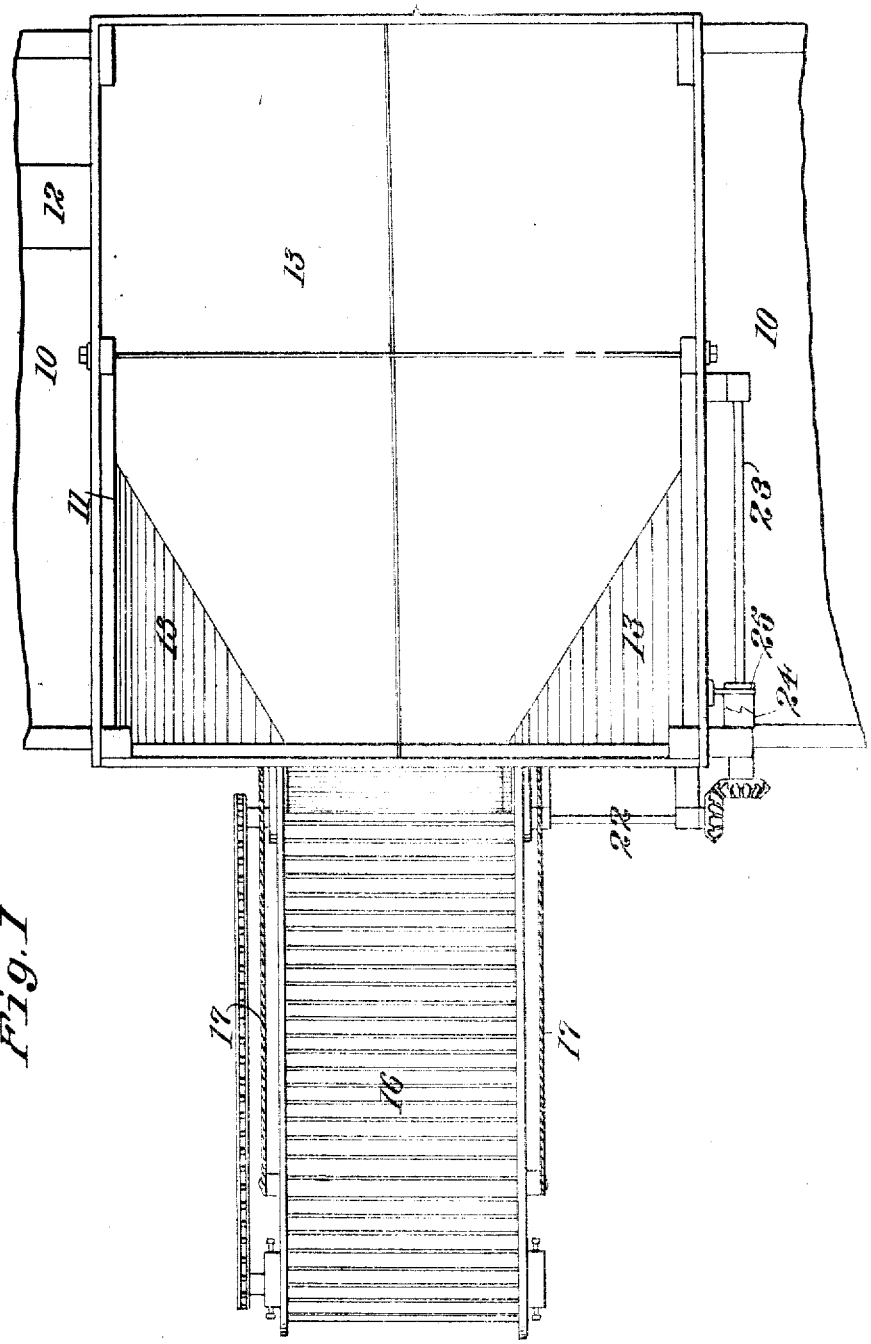

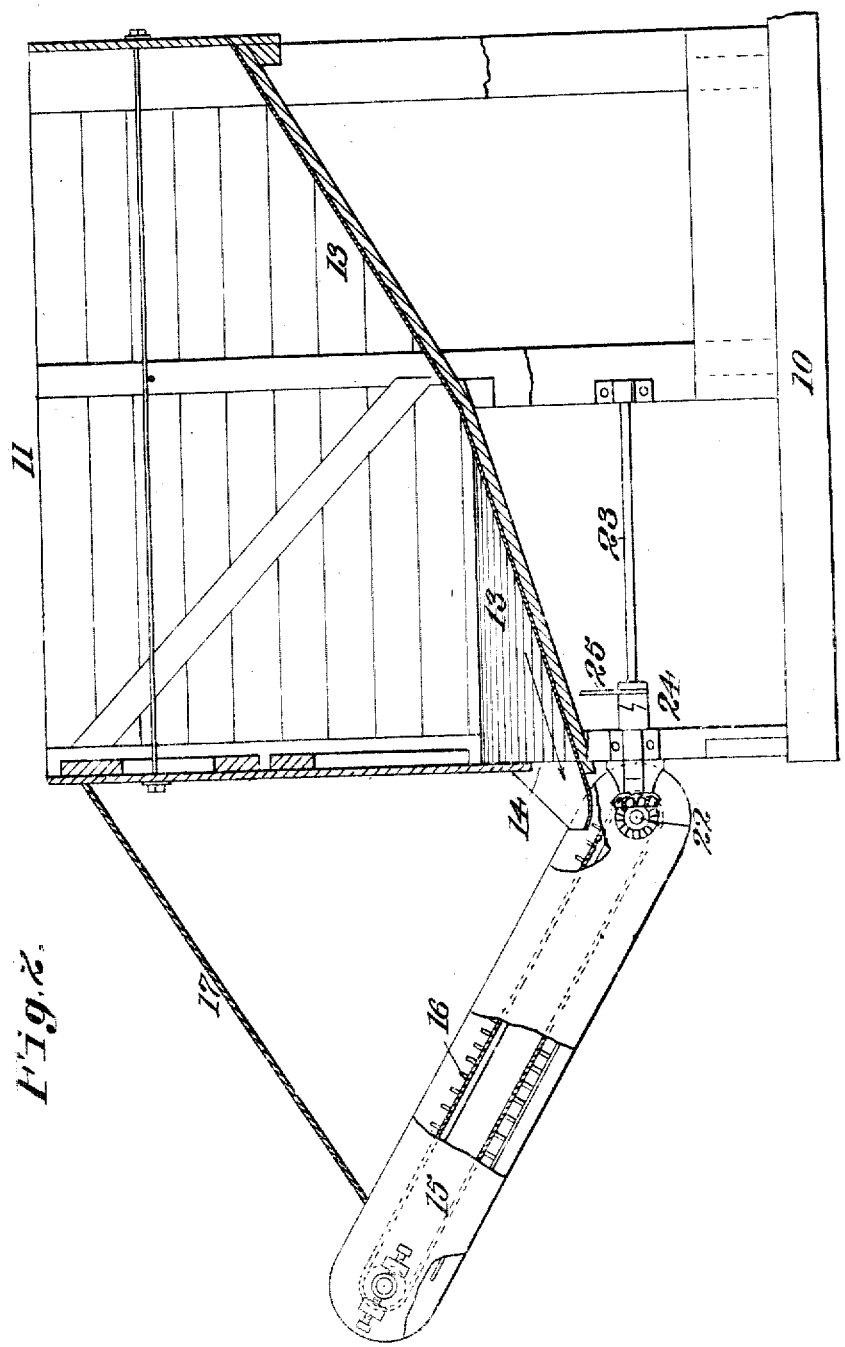

1,344,396.

Patented June 22, 1920.
5 SHEETS—SHEET 3.

WITNESSES:
Charles Pickles
Thos Castberg

INVENTOR
Ben C. Holt
BY Strong & Townsend
ATTORNEYS

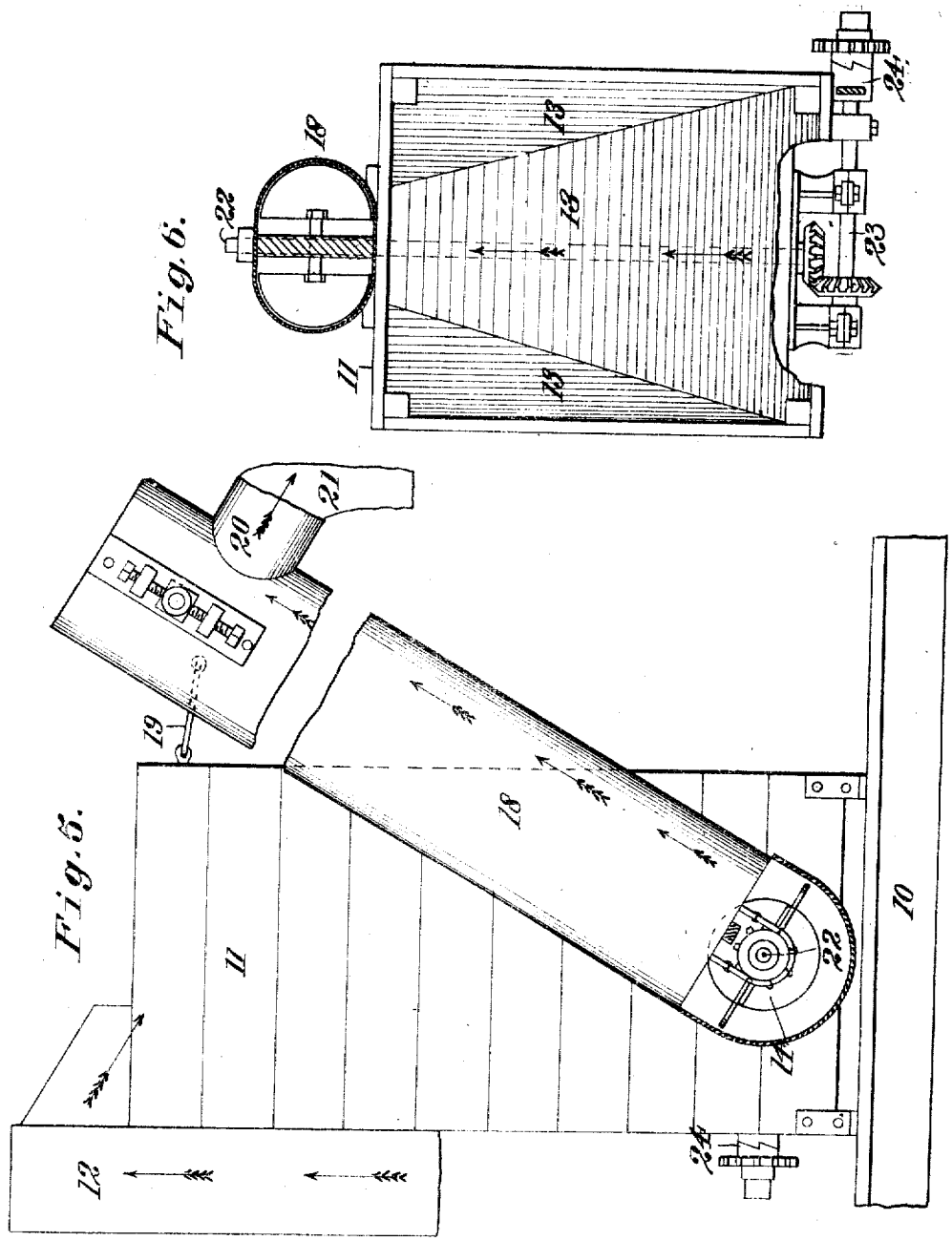

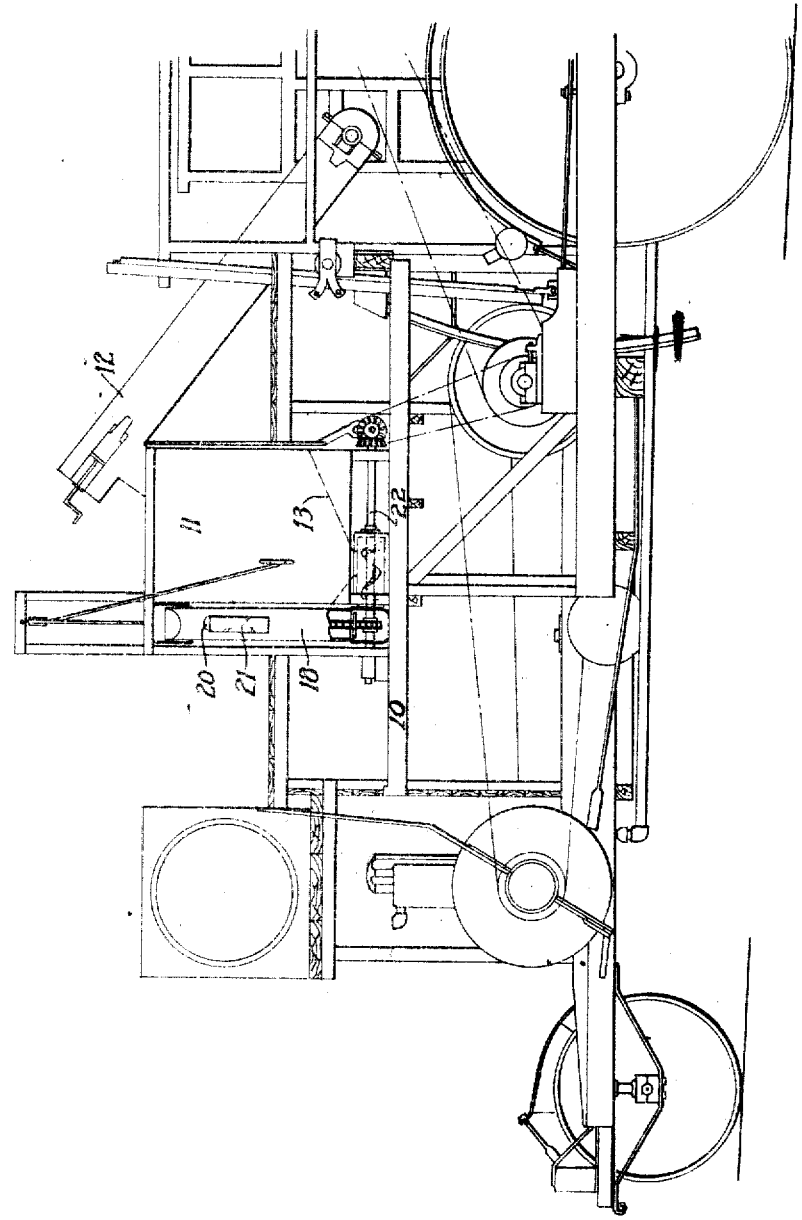

UNITED STATES PATENT OFFICE.

BEN C. HOLT, OF SPOKANE, WASHINGTON, ASSIGNOR TO THE HOLT MANUFACTURING COMPANY, OF STOCKTON, CALIFORNIA, A CORPORATION OF CALIFORNIA.

COMBINED HARVESTER AND THRESHER.

1,344,396.  Specification of Letters Patent.  Patented June 22, 1920.

Application filed December 12, 1916. Serial No. 136,548.

*To all whom it may concern:*

Be it known that I, BEN C. HOLT, a citizen of the United States, residing at Spokane, in the county of Spokane and State of Washington, have invented new and useful Improvements in Combined Harvesters and Threshers, of which the following is a specification.

This invention relates to combined harvesters and threshers, and more particularly to means for handling the threshed grain.

In combined harvesters and threshers the grain from the thresher, as the machine is driven along, is conducted to sacks, an attendant being required to adjust the empty sacks in place, remove and sew the filled sacks, and dispose of them upon the ground or elsewhere. This operation entails a great expense in labor and cost of sacks. There is a duplication of labor in most instances, since the grain is immediately afterward stored in bulk in the bins of elevators, and it, therefore, becomes necessary to dump the sacks soon after they are filled. Moreover, it is more expensive to haul grain by wagon when it is sacked than when in bulk, inasmuch as the carrying capacity of the wagon is greatly decreased when the grain is sacked. The cost of sacks is becoming higher and a great many of such are required for the harvesting operation. Oftentimes the sacked grain is thrown upon the ground and in case of a sudden storm is in danger of becoming damaged. There is also a noticeable loss of grain resulting from the sacking, as in removing the filled sacks and in applying the empty sacks to the spout a considerable amount of grain falls onto the sacking stand and thence to the ground.

With the object in view of overcoming these well-founded objections urged against the sacking of grain as it comes from a harvester thresher, I have provided means in the form of a simple attachment which will permit the handling and hauling of grain in bulk. Briefly, this attachment consists of a bin positioned upon the harvester thresher to receive the grain as it comes from the usual sacking spout and a suitable elevator coöperating with the bin to convey the grain a sufficient distance to one side of the machine to permit a wagon to be driven alongside and receive the grain in bulk therefrom, with appropriate controlling and operating means for the elevator. The capacity of the bin is such that the wagons need not be filled with any such continuity as is required in the case of grain growsacks. Actual figures kept by grain growers show a saving of two-thirds in the cost of handling grain as a result of the use of this invention.

In the accompanying drawings two forms which my invention may assume are illustrated:

Figure 1 shows a plan view of one form of bulk grain attachment.

Fig. 2 shows a vertical, sectional view of the same.

Fig. 5 shows an elevation of the same, illustrating the end opposite to that shown in Fig. 3.

Fig. 6 shows a plan view thereof.

Fig. 7 shows a side elevation of a harvester embodying the present invention.

Figure 4:
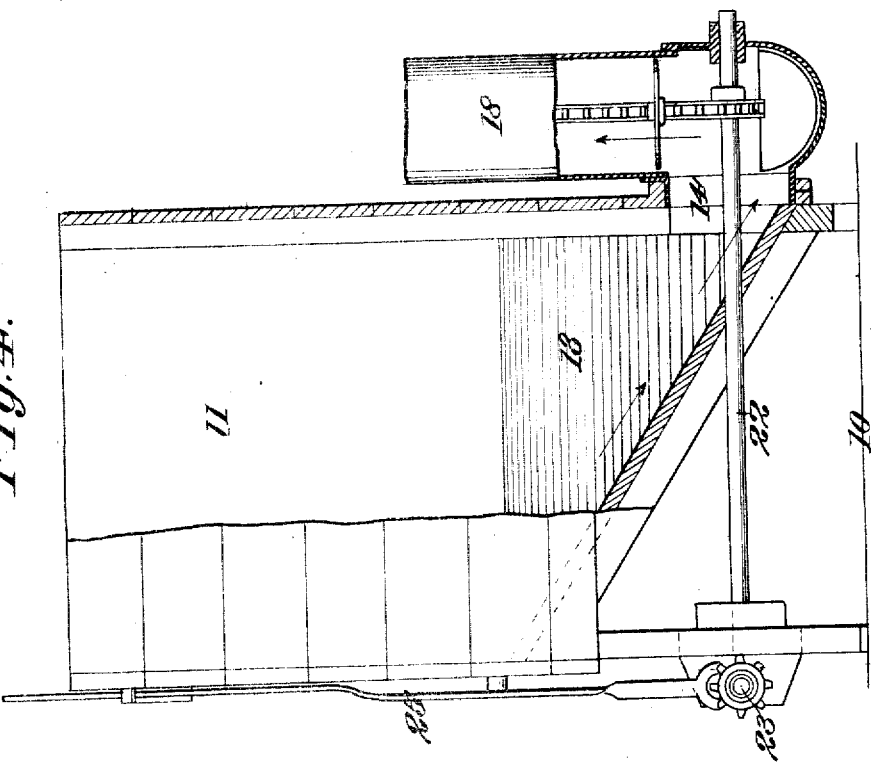
Fig. 4 shows a side elevation of the same, partly in section.

In the drawings, the frame of a harvester thresher is indicated at 10, this being the portion thereof known as the "sacking stand." Mounted upon the sacking stand is a bin 11 in position to receive grain directly from the elevator 12, leading from the threshing mechanism and known generally as the "sacking spout." The bin is preferably constructed with inclosed sides, open top and an inclined bottom 13, the latter leading to one side where an opening 14 establishes communication with an elevator 15.

Figure 3:
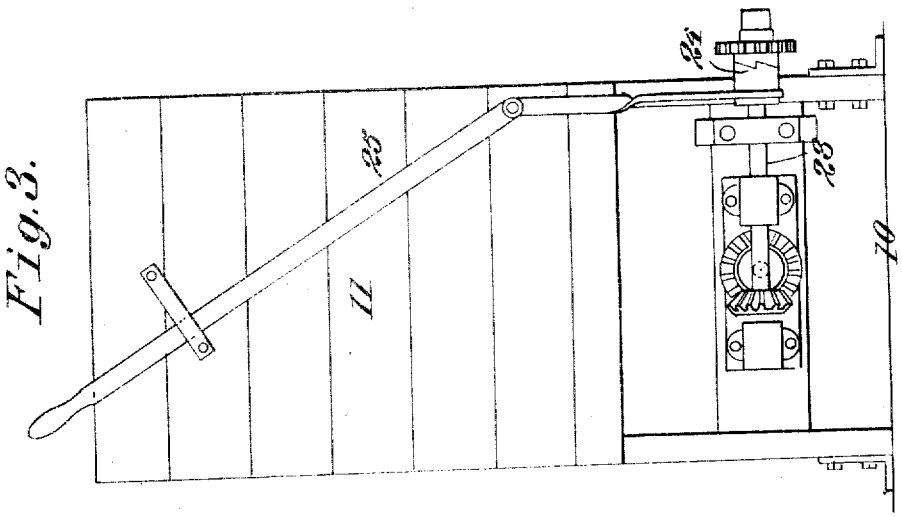
Fig. 3 shows an end elevation of a second form of my invention.

I show two forms of elevators 15, one in Figs. 1 and 2, consisting of a flat, endless conveyer 16 hinged to one side of the bin and raised and lowered by means of a rope 17. In Figs. 3, *et seq.*, I show a tubular conveyer 18 mounted at the rear of the bin on an axis extending longitudinally of the machine, said conveyer being adapted to swing out to one side and be held by a suitable support 19. In connection with the tubular elevator I show a discharge spout 20, at the outer end, equipped with a cloth or flexible portion 21, the better to conduct the grain into the wagon in case the movements of the wagon and harvester should not be uniform.

A driving shaft 22, suitably journaled on the bin, is provided for the elevator 15 and has a driving connection with a suitable source of power, preferably some rotatable part of the harvester thresher, represented by a shaft 23. A clutch 24 operated by a lever 25 or other shifting device is used to control the driving connection between the shafts 22 and 23.

Grain is being continuously deposited into the bin 11 from the first elevator 12 as the machine moves along in operation and may be allowed to accumulate therein for a brief period of time. A wagon is driven into juxtaposition with the discharge end of the elevator 15 and the conveyer driving mechanism then thrown into operation. The wagon moves alongside of the harvester thresher until filled, whereupon the conveyer driving mechanism is unclutched and the discharge of grain from the bin discontinued until another wagon is in place.

The carrying capacity of the emptying elevator 15 will, preferably, be greater than that of the filling elevator 12, in order that the operation of loading the wagon may be somewhat shortened, the accumulated grain in the bin, as well as that deposited therein during the period of filling the wagon, being discharged by the elevator 15.

Other changes in the arrangement and construction of the several parts than those here indicated may be employed without departing from the spirit of my invention as disclosed in the appended claims.

Having thus described my invention, what I claim and desire to secure by Letters Patent is —

1. A bulk grain attachment for traveling threshers comprising a receptacle of large capacity detachably connected to the side of the thresher frame beneath the usual grain spout, an upwardly and outwardly extending elevator carried by the receptacle for discharging grain therefrom into a vehicle moving alongside the thresher and operating means for the elevator connected to the threshing mechanism.

2. A bulk grain attachment for traveling threshers comprising a receptacle of large capacity detachably connected to the side of the thresher frame beneath the usual grain spout, an upwardly and outwardly extending elevator carried by the receptacle for discharging grain therefrom into a vehicle moving alongside the thresher, and operating means for the elevator connected to the threshing mechanism, said elevator comprising a tubular conveyer pivoted to swing in a vertical plane.

3. A bulk grain attachment for traveling threshers comprising a receptacle of large capacity detachably connected to the side of the thresher frame beneath the usual grain spout, an upwardly and outwardly extending elevator carried by the receptacle for discharging grain therefrom into a vehicle moving alongside the thresher, operating means for the elevator connected to the threshing mechanism, said elevator comprising a tubular conveyer pivoted to swing in a vertical plane, and a flexible outlet member extending angularly from the upper end of the conveyer.

In testimony whereof I have hereunto set my hand in the presence of two subscribing witnesses.

BEN C. HOLT.

Witnesses:
 WADE GOODMAN,
 MARTHA DAUGHS.